Nov. 23, 1954 T. G. HOWARD 2,695,343
COMBINATION HIGH-LOW LIGHT SWITCH AND TURN INDICATOR
Filed March 27, 1950 2 Sheets-Sheet 1
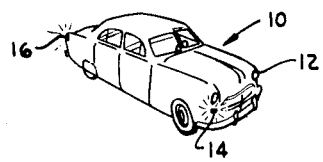
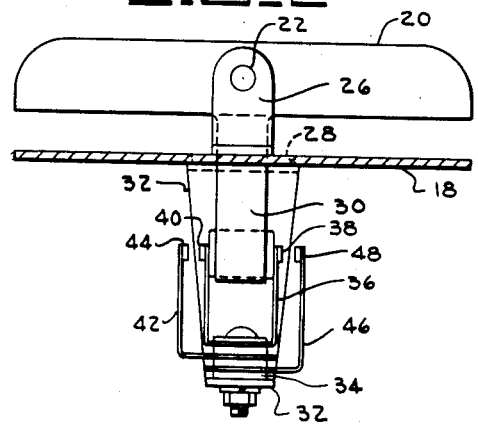
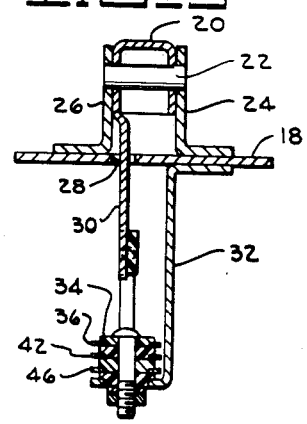
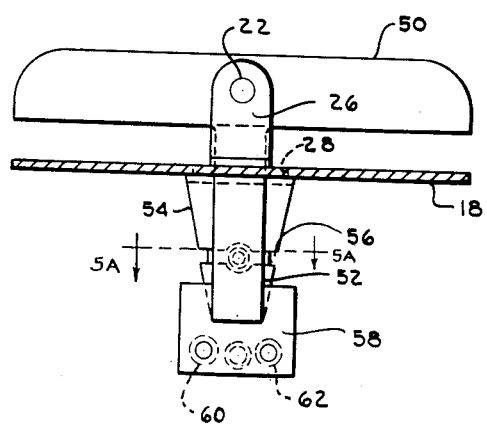
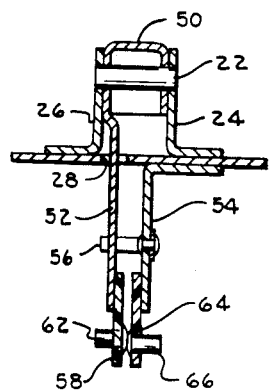
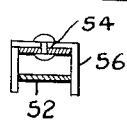
INVENTOR.
THYRA GREY HOWARD
BY
ATTORNEY Nov. 23, 1954  T. G. HOWARD  2,695,343
COMBINATION HIGH-LOW LIGHT SWITCH AND TURN INDICATOR
Filed March 27, 1950  2 Sheets-Sheet 2
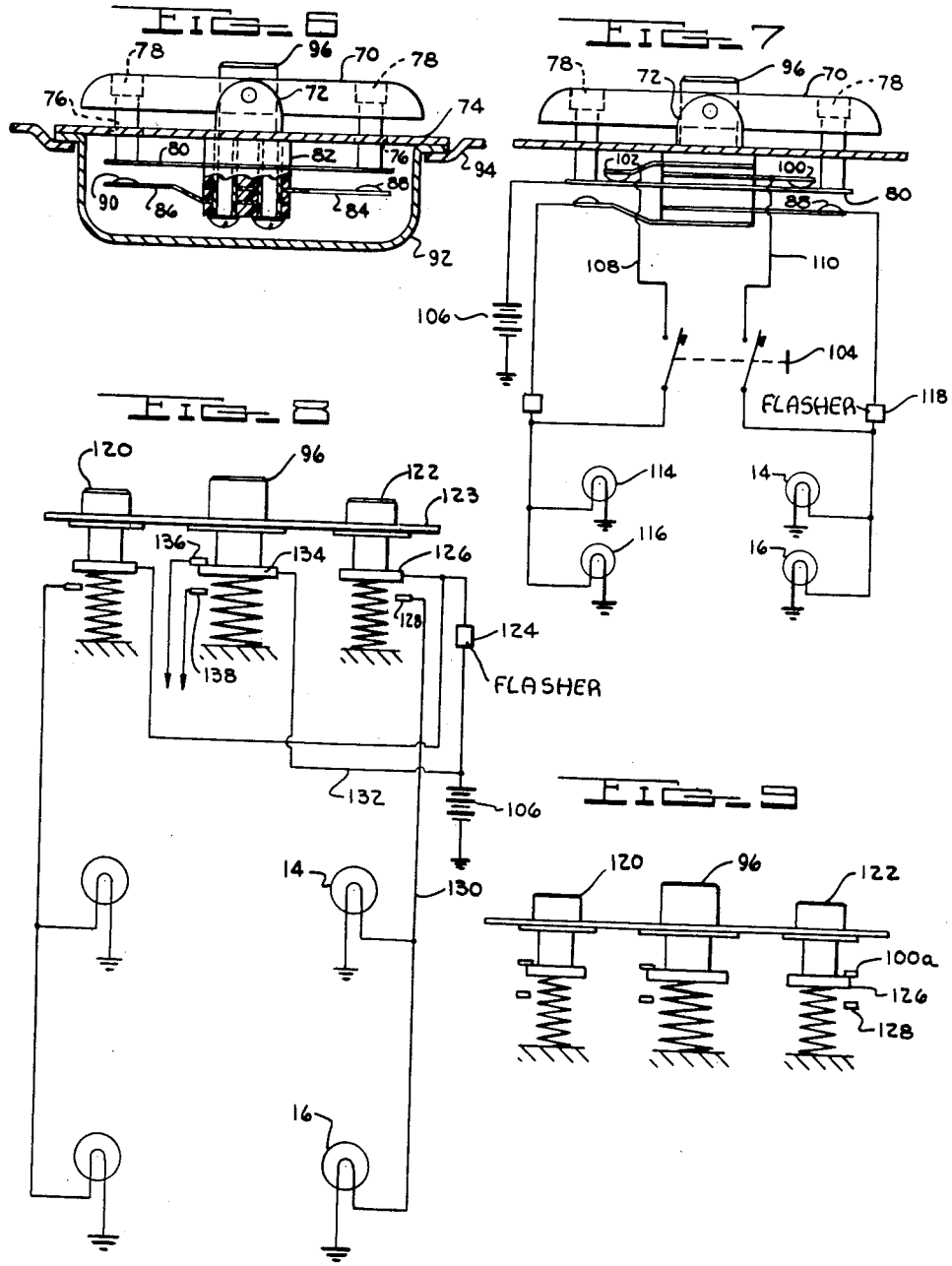
INVENTOR.
THYRA GREY HOWARD
BY
ATTORNEY

United States Patent Office 2,695,343
Patented Nov. 23, 1954

2,695,343

COMBINATION HIGH-LOW LIGHT SWITCH AND TURN INDICATOR

Thyra Grey Howard, Detroit, Mich.

Application March 27, 1950, Serial No. 152,049

3 Claims. (Cl. 200—61.29)

This invention relates generally to an improved lighting system for vehicles, and more particularly to a novel switch and circuit arrangement, primarily adapted for controlling the operation of the directional signal lights of a motor vehicle and which may also be adapted for controlling the beam of the headlights and the parking or other auxiliary lights of said vehicle.

In the various embodiments of the invention forming the subject matter of this application, lighting systems are provided which have controls therefor adapted to be located in the floor of the vehicle adjacent the driver's seat. When used with vehicles equipped with automatic transmissions, a convenient location is near the area usually occuplied by the foot clutch pedal.

In vehicles having automatic transmissions in which the clutch foot pedal is eliminated, the left foot of the driver normally performs no useful function in the operation thereof, and it is therefore an object of the present invention to provide controls for the lighting system which are so located and constructed as to be readily actuated by the left foot of the operator of the vehicle.

It is another object of the present invention to provide controls for a lighting system of a motor vehicle in which the turn indicator switch and the dimmer control switch are mounted in a unitary housing to provide a control unit characterized by its simplicity of use and installation and which permits the driver to operate the vehicle with facility and safety to himself and which may be readily manufactured and installed at substantial savings in cost over the cost of manufacturing and installing the switches as separate units.

It is a further object of the present invention to provide a lighting system for an automobile which is characterized by its simplicity and minimum use of wiring and electrical apparatus whereby it is relatively inexpensive to manufacture, install, service and repair.

It is a further object of the present invention to provide a foot actuated switch unit for controlling the lighting system of a motor vehicle and which is provided with a housing supported in the floor of the vehicle for mounting the turn indicator switch as well as the headlight beam control switch whereby the driver of the vehicle can selectively actuate either of the switches with ease and facility.

Other objects of this invention will appear in the following description and appended claims, reference being had to the accompanying drawings forming a part of this specification wherein like reference characters designate corresponding parts in the several views.

In the drawings:

Fig. 1 of the drawings is a perspective view of an automobile having lamps adapted to be controlled by the lighting system of the present invention.

Fig. 2 is a front elevational view of a switch unit of the present invention adapted to be mounted on the floor of a motor vehicle.

Fig. 3 is a sectional view of the switch unit shown in Fig. 2.

Fig. 4 is a front elevational view of a modified form of the invention shown in Fig. 2.

Fig. 5 is a sectional view of the invention shown in Fig. 4.

Figure 5A is a section taken on the 5A—5A of Fig. 4.

Fig. 6 is a front elevational view partly in section of still another modification of the present invention.

Fig. 7 is still another modification of the present invention showing a schematic wiring diagram suitable for use with the present invention.

Fig. 8 is still another modification of the present invention showing another schematic diagram of a suitable wiring arrangement for the preesnt invention.

Fig. 9 is still another modification of the present invention showing a front elevational view thereof.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring now to the drawings, Fig. 1 shows an automobile 10 having conventional headlamps 12 and turn indicator lamps 14 and 16. The latter lamps are designed to enable the driver of the automobile to signal properly when a turn to either the right or left is to be made. At the present time, the direction signal control for these lamps is installed in the vicinity of the steering wheel of the automobile to be hand actuated by the driver.

The present invention provides for the control being located on the floor of the vehicle in a location where it can be actuated by the left foot of the driver. With this construction, the operator of the vehicle will always have both hands free to steer the car and will not have to shift his eyes from the road to find levers or switches located on the steering post or on the instrument panel.

Referring to Figs. 2 and 3 of the drawings, one embodiment of the present invention can be seen mounted on the plate 18. A substantially horizontally disposed pressure bar 20 is pivotally mounted by means of the pin 22 to the brackets 24 and 26. The brackets 24 and 26 are secured to the plate 18 by welding or other suitable means. An elongated slot 28 is provided in the plate 18 through which a lever arm 30 depends from the pressure bar 20.

Secured to the underside of the plate 18 is a bracket member 32, which has contact spring 36 secured to its lower end by the insulating member 34. The contact spring 36 is operatively connected at its upper ends to the lever arm 30 and has contacts 38 and 40 mounted at its upper ends and on opposite sides of the lever arm 30.

A contact spring 42 is also mounted on the lower end of the bracket member 32 and is insulated from the contact spring 36. At the upper end of the contact spring 42 is a contact 44 disposed opposite the contact 40 to be engaged thereby when said lever arm 30 is moved to the left as seen in Fig. 2.

Another contact spring 46 is secured to the lower end of the bracket member 32 and is insulated from the contact springs 42 and 36. The upper end of the contact spring 46 has a contact 48 disposed opposite the contact 38 to be engaged thereby when the lever arm 30 is moved to the right as seen in Fig. 2.

In use, a lighting circuit including the right turn indicator lamps will be provided including therein the contacts 40 and 44, while a circuit including the contact 38 and 48 will be provided for controlling the left turn indicator lamps. Thus, it can be seen that when the horizontally disposed pressure bar 20 is depressed on its right end by the operator of the vehicle, the right turn indicator lamps will be flashed as a result of closing the contacts 40 and 44, while when the left end of the horizontal pressure bar 20 is depressed the contacts 38 and 48 will be closed causing the left turn indicator lamps to be flashed. The wiring circuit for this control switch will be explained hereinafter with respect to one or the other modification disclosed.

Referring now to Figs. 4 and 5, another modification of the present invention can be seen wherein like reference numbers indicate like parts. A substantially horizontally disposed pressure bar 50 is shown which is similar in construction to that described in the previous modifications, but it has a slightly different lever arm.

The pressure bar 50 is pivotally mounted by means of the pin 22 to the brackets 24 and 26 which are secured to the pressure plate 18. A longitudinal slot 28 is provided in the plate 18 through which the lever arm 52 depends.

A bracket member 54 is secured to the under surface of the plate 18 and has a flat spring 56 secured thereto which overlaps the ends of the lever arm 52 to maintain the pressure bar 50 in a substantially horizontal position. An insulating member 58 is secured to the lower end of the lever arm 52 and has contacts 60 and 62 connected thereto, while the insulating member 64 is secured to the lower end of the bracket member 54 and has the contact 66 connected thereto.

In use, the contacts 62 and 66 will be wired in a circuit with the left turn indicator lamps so that when the pressure bar 50 is depressed on the left end the left turn indicator lamps will be flashed and similarly when the right end of the pressure bar 50 is depressed the contacts 60 and 66 will be closed causing the right turn indicator lamps to flash. When the operator of the vehicle releases the pressure bar the spring member 56 will cause the lever arm 52 to be returned to its neutral position.

Another embodiment of the present invention is shown in Fig. 6 of the drawing. Here a horizontally disposed pressure bar 70 is shown pivotally mounted to bracket member 72 in a manner similar to that disclosed in the previously described embodiments. The plate 74 has openings 76 therein through which the pins 78 depend from the pressure bar 70. The lower ends of the pins 76 are joined together by a leaf contact spring 80 which is mounted intermediate its ends in the insulating block 82 secured to the lower surface of the plate 76. Also mounted in the insulating block 82 are the contact springs 84 and 86. Contact spring 84 has the contact 88 at its one end adapted to be engaged by the leaf contact spring 80 when the pressure bar 70 is depressed at its right end, and the contact spring 86 has a contact 90 at its outer end adapted to be engaged by the leaf contact spring 80 when the left end of the horizontally disposed pressure bar 70 is depressed. This embodiment of the invention operates in the same manner as described for the embodiment of Figs. 1 and 2 and the embodiments of Figs. 4 and 5.

Also shown in Fig. 6 is a housing member 92 for enclosing the switch unit. The housing is shown mounted in the floor plate 94 of the vehicle. It should be understood that this housing construction can be used with any of the embodiments shown herein.

A selector switch 96 is also shown in Fig. 6 which is adapted for use in selecting the high or low beam of the head lamps. The selector switch 96 is a conventional switch of the type used for controlling the beam of the headlights of a vehicle. This selector switch can be mounted in the housing 92 together with the turn indicator switch. In the present embodiment the selector switch 96 is disposed behind the pressure bar 70 and projects above the pressure bar 70 so as to be easily located and actuated by the driver of the vehicle.

The embodiment of the invention shown in Fig. 7 is very similar to that shown in Fig. 6, but includes in addition, contacts for controlling auxiliary lamps, such as parking lamps for example, where it is desired to use these auxiliary lamps for turn indicator lamps as well.

Additional contacts 100 and 102 are provided which normally engage the leaf contact spring 80. As can be seen when the switch 104, which may be located on the instrument panel of the vehicle, is closed a closed circuit will be provided from the battery 106 through the leaf spring contact 80, contacts 100 and 102, conductors 108 and 110, to the auxiliary lamps 114 and 116 and the auxiliary lamps 14 and 16. In this manner the lamps cam be used as parking lamps if desired.

Thus, if the horizontally disposed pressure bar 70 is depressed on its right end contact between the contact spring 80 and the contact 100 will be interrupted and the contact spring 80 will engage the contact 88 providing a closed circuit from the battery 106 through the flasher 118 to the lamps 14 and 16. In this manner, the lamps 114 and 116 can remain in use for auxiliary purposes while the lamps 14 and 16 are used as turn indicators, and vice versa.

Other embodiments of the present invention are shown in Figs. 8 and 9. In the embodiment of Fig. 8 a switch unit is provided which functions substantially the same as those hereinabove described. In this embodiment spring loaded buttons 120 and 122 are provided in the plate 123 for actuating the left or right turn indicator lamps respectively. As can be seen in the wiring diagram, when button 122, for example, is depressed a closed circuit will be provided through the battery 106, flasher 124, contacts 126 and 128, conductor 130 and through the lamps 14 and 16. Also shown in this circuit diagram is a conductor 132 which is connected to the contact 134 which can be selectively engaged to either the contact 136 or 138 for controlling the high or low beams of the head lamps in a conventional manner.

The embodiment of the invention shown in Fig. 9 is very similar to that shown in Fig. 8, but is adapted for use where the parking lamps are desired to be used for turn indicator lamps in a manner similar to that described with respect to the embodiment shown in Fig. 7. A wiring circuit similar to that shown in Fig. 7 can be employed wherein the contact 100a will be utilized in the auxiliary circuits and will correspond to the contact 100 shown in Fig. 7.

From the above description, it can be seen that a new and improved switch unit is provided which enables the driver of the vehicle to control the turn indicator lamps with the greatest of ease and facility, and which enables him to do so without removing either of his hands from the steering wheel or taking his eyes from the road so as to ensure himself and others on the road the greatest safety while he is making the turn. Further, the turn indicator lamps will automatically stop flashing when the turn indicator switch is released. It should be understood however that it is within the contemplation of the present invention to provide means whereby the turn indicator switch can be actuated and the flasher lamp will continue to operate until a mechanism opens the circuit after the turn has been completed.

It can be seen further that a switch unit is provided which is suitably housed and adapted to include the head lamp beam selector switch. With the turn indicator switch and the selector switch located together in this manner, the driver of the vehicle can actuate either of these switches with the greatest of ease, and the cost of installing, maintaining and repairing the lighting circuits will be less than in the lighting systems heretofore known for automobiles. The latter is particularly true since the present invention permits a minimum of wiring and apparatus to be used.

Having thus described my invention, I claim:

1. A turn indicator switch unit adapted to be mounted on the floor of an automobile comprising a horizontally disposed pressure bar pivotally mounted on said floor and having a lever arm depending therefrom, a bracket mounted on said floor, spring means resiliently connecting said lever arm and said bracket for maintaining said pressure bar in a horizontal position, and contacts mounted on opposite sides of said lever arm adapted to be selectively closed when said pressure bar is selectively depressed on one or the other of its ends.

2. A turn indicator switch unit adapted to be mounted on the floor of an automobile comprising a horizontally disposed pressure bar pivotally mounted on said floor and having a lever arm depending therefrom, a bracket mounted on said floor, spring means resiliently connecting said lever arm and said bracket for maintaining said pressure bar in a horizontal position, contacts mounted in spaced apart relation on said lever arm adjacent said bracket, a contact mounted on said bracket midway between said contacts, whereby when said pressure bar is pivoted in one direction one of the contacts on said lever arm will engage said contact on said bracket and when said pressure bar is pivoted in the other direction the other of said contacts will engage said contact.

3. A switch unit adapted to be mounted on the floor of an automobile for controlling lamps thereof comprising a housing, a horizontally disposed pressure bar pivotally mounted on said housing, first contacts resiliently mounted in said housing and connected to said pressure bar through openings in said housing for maintaining said pressure bar in a horizontal position, second contacts mounted in said housing and adapted to be selectively engaged by said first contacts when said pressure bar is selectively depressed on one or the other of its ends.

(References on following page)

References Cited in the file of this patent

UNITED STATES PATENTS

| Number | Name | Date |
|---|---|---|
| 497,144 | Teal | May 9, 1893 |
| 502,300 | Kells | Aug. 1, 1893 |
| 1,095,902 | Marston | May 5, 1914 |
| 1,562,803 | Stone | Nov. 24, 1925 |
| 1,674,027 | Van Deventer | June 19, 1928 |
| 1,679,833 | Laugeson | Aug. 7, 1928 |
| 1,754,365 | Lee | Apr. 15, 1932 |
| 2,032,841 | Gerhart | Mar. 3, 1936 |
| 2,122,508 | Bell | July 5, 1938 |
| 2,238,394 | Murray | Apr. 15, 1941 |
| 2,267,743 | Murray | Dec. 30, 1941 |
| 2,298,782 | Bluemle | Oct. 13, 1942 |